United States Patent
Suzuki et al.

(10) Patent No.: US 11,385,136 B2
(45) Date of Patent: Jul. 12, 2022

(54) TIRE REPLACEMENT METHOD AND TIRE REPLACEMENT INSTRUCTION DEVICE

(71) Applicant: BRIDGESTONE CORPORATION, Tokyo (JP)

(72) Inventors: Eiichi Suzuki, Tokyo (JP); Takanao Shoji, Tokyo (JP); Yuuki Hara, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 235 days.

(21) Appl. No.: 16/645,373

(22) PCT Filed: Sep. 3, 2018

(86) PCT No.: PCT/JP2018/032525
§ 371 (c)(1),
(2) Date: Mar. 6, 2020

(87) PCT Pub. No.: WO2019/049807
PCT Pub. Date: Mar. 14, 2019

(65) Prior Publication Data
US 2020/0300733 A1    Sep. 24, 2020

(30) Foreign Application Priority Data

Sep. 6, 2017   (JP) .............................. JP2017-170753

(51) Int. Cl.
G01M 17/02   (2006.01)
G06Q 10/00   (2012.01)

(52) U.S. Cl.
CPC ............ G01M 17/02 (2013.01); G06Q 10/20 (2013.01)

(58) Field of Classification Search
CPC ............................... G06Q 10/20; G01M 17/02
See application file for complete search history.

(56) References Cited

U.S. PATENT DOCUMENTS

| 5,231,872 A | 8/1993 | Bowler et al. |
| 2004/0073339 A1 | 4/2004 | Ruoppolo |
| 2017/0010185 A1 | 1/2017 | Shaffer |

FOREIGN PATENT DOCUMENTS

| EP | 0 232 213 A2 | 8/1987 |
| JP | 2002-131191 A | 5/2002 |

(Continued)

OTHER PUBLICATIONS

"86' Dually—tire rotation between front and back?" The Online Resource for 1947—Current Chevy and GMC Trucks since 1997, Jan. 7, 2013, [http://67-72chevytrucks.com/vboard/showthread.php?t=586343].

(Continued)

Primary Examiner — Natalie Huls
Assistant Examiner — Cynthia L Davis
(74) Attorney, Agent, or Firm — Oliff PLC

(57) ABSTRACT

When tires of a vehicle equipped with two front tires and four rear tires are to be replaced, a life amount L, which serves as an indicator for tire replacement, is grasped for the front and rear tires of a plurality of vehicles that are to be tire replacement targets. After extracting, from among the plurality of vehicles, a vehicle α equipped with the rear tires having a life amount of (⅓) L and a vehicle ß equipped with the rear tires having a life amount of 0, the rear tires of the vehicle ß are replaced with the front tires of the vehicle α and the front tires of the vehicle ß, and new tires are fitted to the vehicle α and the vehicle ß as the front tires of the vehicle α and the front tires of the vehicle ß.

4 Claims, 5 Drawing Sheets

(56) References Cited

FOREIGN PATENT DOCUMENTS

| | | |
|---|---|---|
| JP | 2002-183260 A | 6/2002 |
| JP | 2002-277232 A | 9/2002 |
| JP | 2004-534204 A | 11/2004 |
| JP | 2009-092556 A | 4/2009 |
| JP | 2009-262817 A | 11/2009 |
| JP | 2011-242133 A | 12/2011 |
| WO | 2016/203741 A1 | 12/2016 |
| WO | 2017/082362 A1 | 5/2017 |
| WO | 2018/168540 A1 | 9/2018 |

OTHER PUBLICATIONS

Apr. 23, 2021 Extended Search Report issued in European Patent Application No. 18854568.5.
Nov. 13, 2018 International Search Report issued in International Patent Application No. PCT/JP2018/032525.

FIG.2
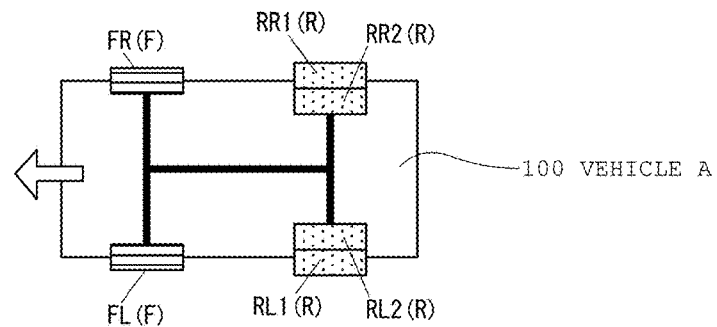
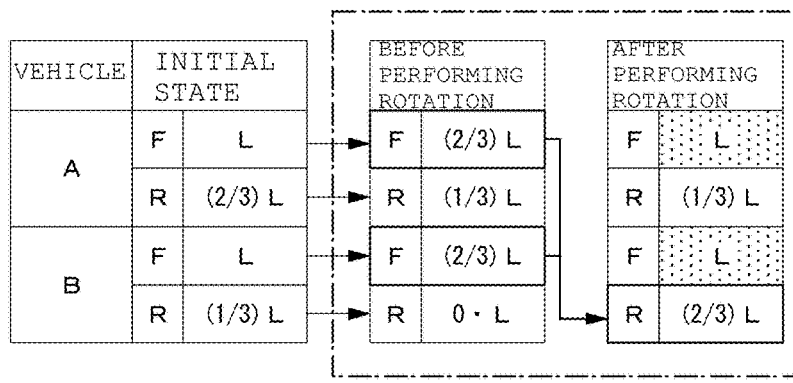
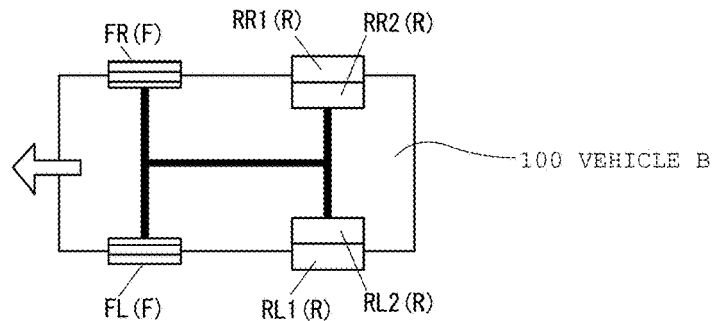
FIG.3
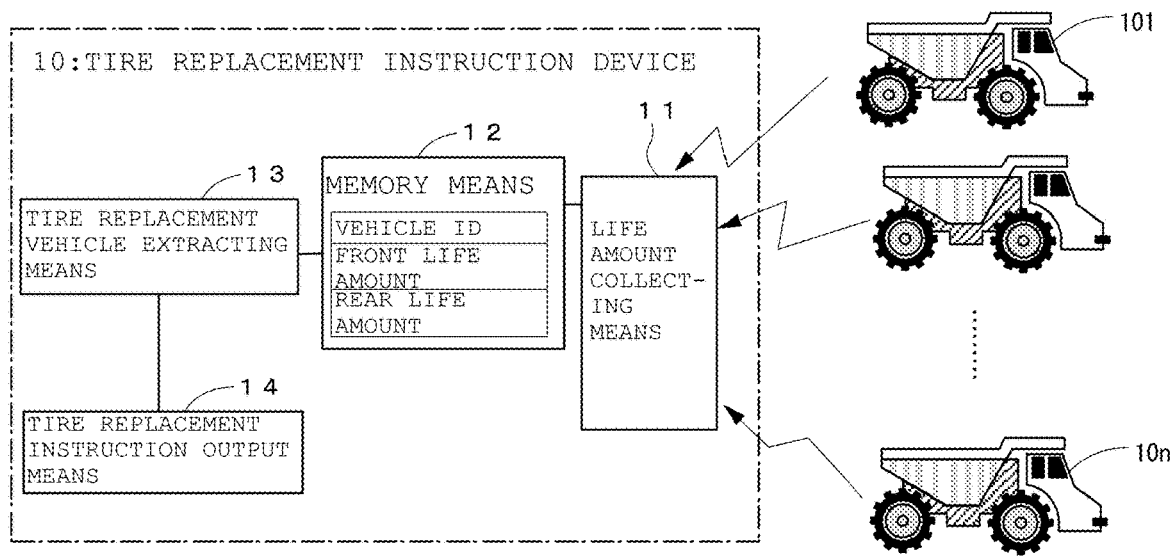

TIRE REPLACEMENT METHOD AND TIRE REPLACEMENT INSTRUCTION DEVICE

TECHNICAL FIELD

The present invention relates to a method for replacing a worn tire, in particular, relates to a method for replacing tires of a plurality of vehicles such as mining vehicles or trucks equipped with two front tires and four rear tires that are different with respect to an indication for tire replacement, and a tire replacement recommendation device.

BACKGROUND

Conventionally, there has been proposed a tire rotation recommendation device that estimates a wear amount of a tire and determines, on the basis of the estimated wear amount, whether or not performance of tire rotation is to be recommended (see, for example, Patent Document 1).

CITATION DOCUMENT

Patent Document

Patent Document 1: Japanese Unexamined Patent Application Laid-open No. 2009-262817

SUMMARY OF THE INVENTION

Technical Problem

However, regarding vehicles that are used in a special environment, a tire replacement condition may be different between front tires and rear tires.

For example, in a case of a mining vehicle equipped with two front tires and four rear tires, a method is being performed in which, when the life amount that serves as an indication for tire replacement such as a wear amount, is L, the front tires are replaced when the life amount becomes ($2/3$) L, and the rear tires are replaced when the life amount becomes 0 (0·L).

FIG. 6 is a diagram illustrating an example of the tire replacement method. For example, in a case of a vehicle A equipped with front tires F which are new tires (life amount=L) and rear tires R having the life amount of ($2/3$) L, after running until the life amount of the front tires F becomes ($2/3$) L, as illustrated as the tire replacement 1 in FIG. 6, the front tires F are replaced with new tires in the first-time tire replacement. At this time, since the life amount of the rear tires is ($1/3$) L, the rear tires are not replaced.

Next, after running until the life amount of the rear tires R becomes 0·L, as illustrated as the tire replacement 2 in FIG. 6, in the next-time tire replacement, the front tires F are replaced with new tires and the rear tires R are also replaced with new tires or another tires that still have a residual life amount.

Further, in a case of a vehicle B equipped with front tires F which are new tires (life amount=L) and rear tires R having the life amount of ($1/3$) L, in the first-time tire replacement, both of the front tires F and the rear tires R are replaced with new tires and, in the next-time tire replacement, only the front tires F are replaced with new tires.

As described above, in a case of vehicles whose tire replacement condition is different between the front tires and the rear tires, it is difficult to apply the conventionally practiced tire rotation.

In addition, a space is required for storing tires, which are demounted from the front and which have residual life amounts, and if appropriate rotation is not carried out, a stock amount of those tires increases or un-used period becomes long. As a result, tire resources have not been used efficiently.

The present invention has been made in view of the conventional problem and aims at providing a method capable of efficiently perform the tire replacement for a vehicle whose tire replacement condition is different between the front tires and the rear tires, and capable of reducing the stock amount of tires, and a tire replacement instruction device.

Solution to Problem

The present invention provides a method for replacing tires of a vehicle equipped with two front tires and four rear tires, the method including: a step (a) of grasping a life amount L, which serves as an indication for tire replacement, of front tires and rear tires of a plurality of vehicles that are to be tire replacement targets; a step (b) of extracting, from among the plurality of vehicles, a vehicle α equipped with rear tires having a life amount of ($1/3$) L; a step (c) of extracting, from among the plurality of vehicles, a vehicle ß equipped with rear tires having a life amount of 0; a step (d) of replacing the rear tires of the vehicle ß with the front tires of the vehicle α and the front tires of the vehicle ß; and a step (e) of fitting new tires to the vehicle α and the vehicle ß as the front tires of the vehicle α and the front tires of the vehicle ß.

The present invention also provides a tire replacement instruction device that outputs an instruction for tire replacement to a vehicle equipped with two front tires and four rear tires, the device including: a life amount collecting means that collects, from a plurality of vehicles that are to be tire replacement targets, information of a life amount L, which serves as an indication for tire replacement, of front tires and rear tires of the plurality of vehicles that are to be the tire replacement targets; a memory means that stores the collected life amount for each of the vehicles; a tire replacement vehicle extracting means that extracts, from among the plurality of vehicles stored in the memory means, a vehicle α equipped with rear tires having a life amount of ($1/3$) L and a vehicle ß equipped with rear tires having a life amount of 0; and a tire replacement instruction output means that outputs the instruction for tire replacement to each of the extracted vehicle α and the extracted vehicle ß, in which the tire replacement instruction output means outputs the instruction to replace the rear tires of the vehicle ß with the front tires of the vehicle α and the front tires of the vehicle ß, and to fit new tires to the vehicle α and the vehicle ß as the front tires of the vehicle α and the front tires of the vehicle ß.

The summary of the invention does not enumerate all the features required for the present invention, and sub-combinations of these features may also become the invention.

BRIEF DESCRIPTION OF THE DRAWINGS

FIG. 2 is a diagram illustrating the method of tire replacement according to the first embodiment of the present invention;

FIG. 3 is a diagram illustrating an example of the configuration of a tire replacement instruction device according to the first embodiment of the present invention;

DESCRIPTION OF EMBODIMENTS

First Embodiment

Figure 1:
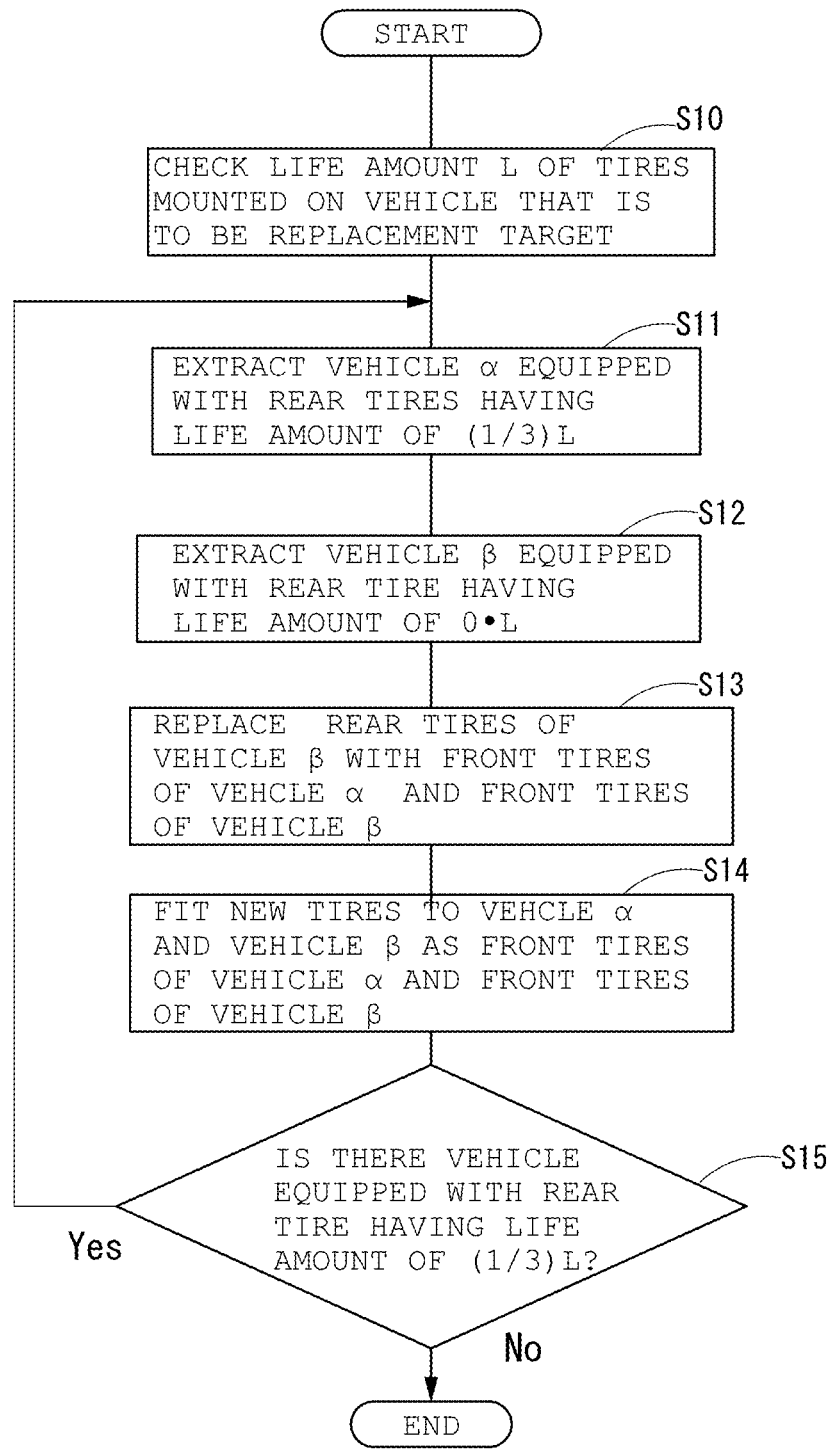
FIG. 1 is a flowchart illustrating a method of tire replacement according to a first embodiment of the present invention.

A tire replacement method according to a first embodiment will be described with reference to the flowchart of FIG. 1 and FIG. 2.

Here, the vehicle in the first embodiment is, as illustrated in FIG. 2, a mining vehicle 100 equipped with two front tires F (FL, FR) and four rear tires (RL1, RL2, RR1, RR2), and the number of vehicles is about 30-40.

Further, the tire replacement is such that, when the life amount that serves as an indication for tire replacement such as a wear amount, is L, the front tires are replaced when the life amount becomes (⅔) L, and the rear tires are replaced when the life amount becomes 0 (0·L).

First, checking in advance the life amount L, which serves as the indication for tire replacement, of the front tires and the rear tires of a plurality of vehicles that are to be tire replacement targets (step S10). In the first embodiment, the life amount L is set to an average time required for the tire to be worn to a predetermined amount at a mining site.

Next, after extracting a vehicle α equipped with rear tires having the life amount of (⅓) L) from among the plurality of vehicles (step S11), extracting a vehicle ß equipped with rear tires having the life amount of 0·L from among the remaining vehicles (step S12).

In the first embodiment, as illustrated in FIG. 2, in the initial state, after running the vehicle A equipped with front tires F that are new tires and equipped with rear tires R having the life amount of (⅔) L until up to the replacement time of the front tires F, this vehicle A was extracted as the vehicle α, and after running the vehicle B equipped with front tires F that are new tires and equipped with rear tires R having the life amount of (⅓) L until up to the replacement time of the front tires F, this vehicle B was extracted as the vehicle ß. Incidentally, the step S12 for extracting the vehicle ß may be performed prior to the step S11 for extracting the vehicle α or may be performed at the same time.

Then, after replacing the rear tires R of the vehicle B with the front tires F of the vehicle A and the front tires F of the vehicle B (step S13), fitting new tires to the vehicle A and the vehicle B as the front tires F of the vehicle A and the front tires F of the vehicle B (step S14).

By this operation, both of the life amount of the front tires F of the vehicle A and the life amount of the front tires F of the vehicle B become L and the life amount of the rear tires R of the vehicle B becomes (⅔) L.

After the tire replacement has been performed, the process proceeds to the step S15 for checking whether or not a vehicle equipped with rear tires R having the life amount of (⅓) L exists among the plurality of vehicles that are to be tire replacement targets other than the vehicle A and the vehicle B. If there is a vehicle, returning back to the step S11 and extracting, as the vehicle α, the vehicle equipped with the rear tires R having the life amount of (⅓) L. Incidentally, if no vehicles exist that are to be the tire replacement targets, the process terminates.

FIG. 3 is a diagram illustrating an example of the configuration of a tire replacement instruction device 10 for realizing the tire replacement method according to the first embodiment. The tire replacement instruction device 10 includes a life amount collecting means 11, a memory means 12, a tire replacement vehicle extracting means 13 and a tire replacement instruction output means 14, and outputs an instruction for tire replacement to the vehicle 100 (101-10n) equipped with two front tires F and four rear tires R.

The life amount collecting means 11 communicates with the plurality of vehicles 100 that are to be tire replacement targets, to collect information of the life amount L, which serves as an indication for tire replacement, of the front tires F and the rear tires R of the plurality of vehicles 100 that are to be the tire replacement targets. As the information of the life amount L, information that serves as the indication of wear amount such as a running time or a running distance, is used. The life amount collecting means 11 collects the information such as the vehicle running time or the running distance transmitted from the vehicle 100 and stores the information as the life amount L in the memory means 12.

The memory means 12 stores a vehicle ID, a life amount $L_F$ of the front tires and a life amount $L_R$ of the rear tires for each of the vehicles 100.

The tire replacement vehicle extracting means 13 extracts, from among the plurality of vehicles stored in the memory means 12, the vehicle α equipped with the rear tires having the life amount of (⅓) L and the vehicle ß equipped with the rear tires having the life amount of 0, and sends the vehicle ID of the extracted vehicle α and the vehicle ID of the extracted vehicle ß to the tire replacement instruction output means 14.

The tire replacement instruction output means 14 outputs the instruction to replace the rear tires R of the vehicle ß with the front tires F of the vehicle α and the front tires F of the vehicle B, and to fit new tires to the vehicle α and the vehicle ß as the front tires F of the vehicle α and the front tires F of the vehicle ß.

With this operation, because the tire replacement can be performed efficiently, the tire resources can be used efficiently.

In the meantime, the output destination for outputting the instruction for tire replacement may be an administration center that administrates the state of vehicles, or may be a pertinent vehicle. In the case of the pertinent vehicle, the administrator is prompted to replace tires, by turning on a lamp indicating that the instruction has been issued and by displaying the content of the instruction on a display.

Second Embodiment

In the first embodiment, after extracting the vehicle α equipped with the rear tires having the life amount of (⅓) L, the vehicle ß equipped with the rear tires having the life amount of 0·L was extracted. However, by extracting the vehicle A equipped with the rear tires having the life amount of (⅓) L and the vehicle B equipped with the rear tires having the life amount is 0·L, making these vehicles A and B to be a tire replacement pair, and performing the tire replacement between the tire replacement pair, the tire replacement can be performed more efficiently.

Hereinafter, the tire replacement method according to a second embodiment will be described with reference to the flow chart of FIG. 3 and FIG. 4.

First, similar to the first embodiment, checking in advance the life amount L, which serves as the indication for tire replacement, of the front tires and the rear tires of a plurality of vehicles that are to be tire replacement targets (step S20).

Next, extracting, from among a plurality of vehicles, a vehicle A equipped with the rear tires having the life amount of (⅔) L and a vehicle B equipped with the rear tires having the life amount of (⅓) L and making these vehicles as a tire replacement pair (step S21).

Figure 4:
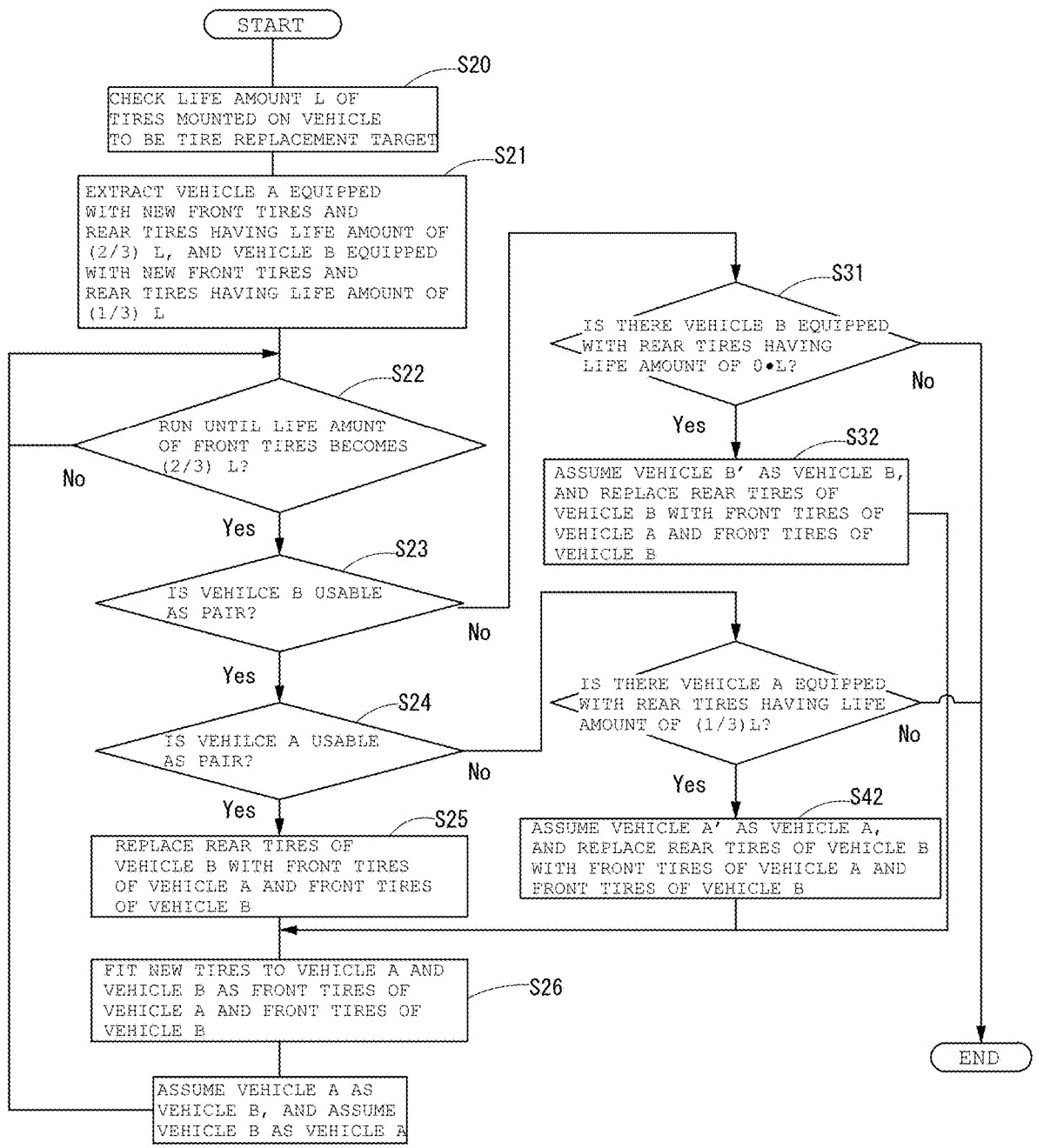
FIG. 4 is a flowchart illustrating a method of tire replacement according to a second embodiment of the present invention.
Figure 5:
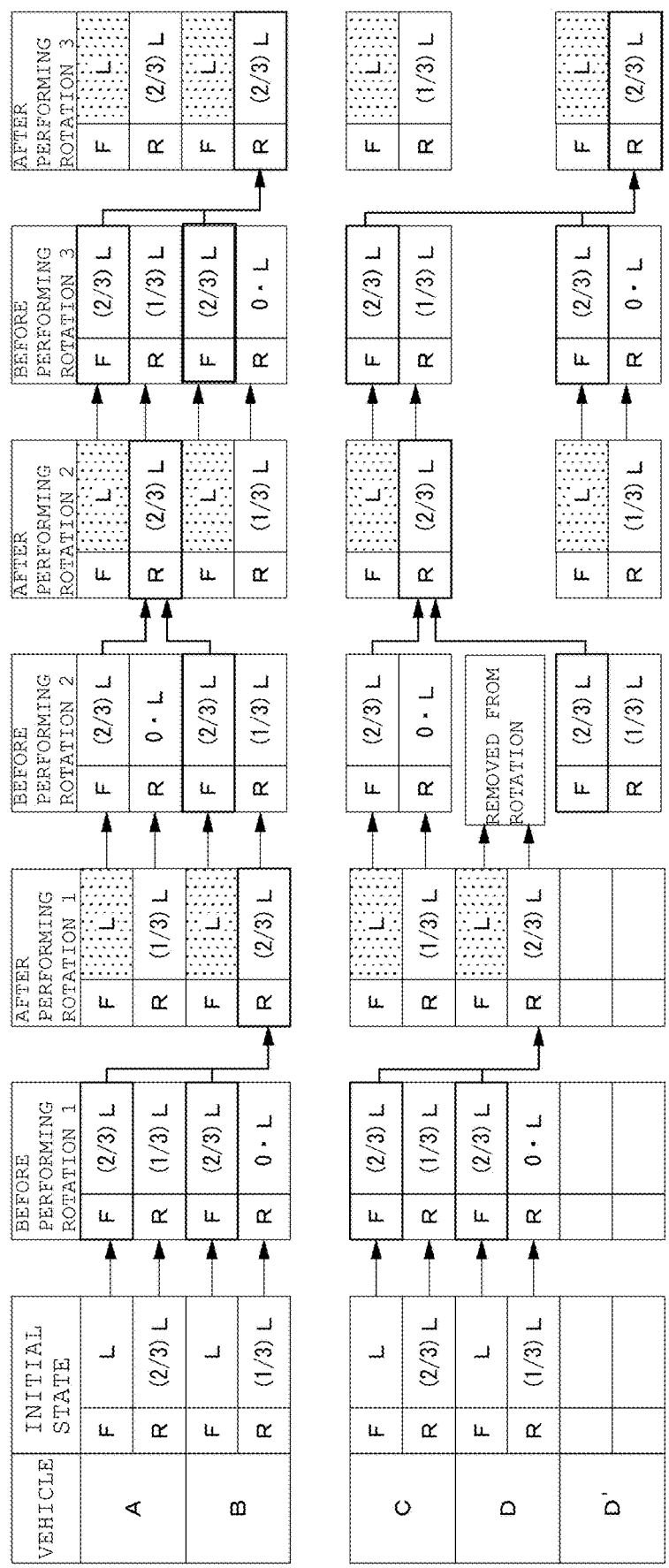
FIG. 5 is a diagram illustrating the method of tire replacement according to the second embodiment of the present invention.
Figure 6:
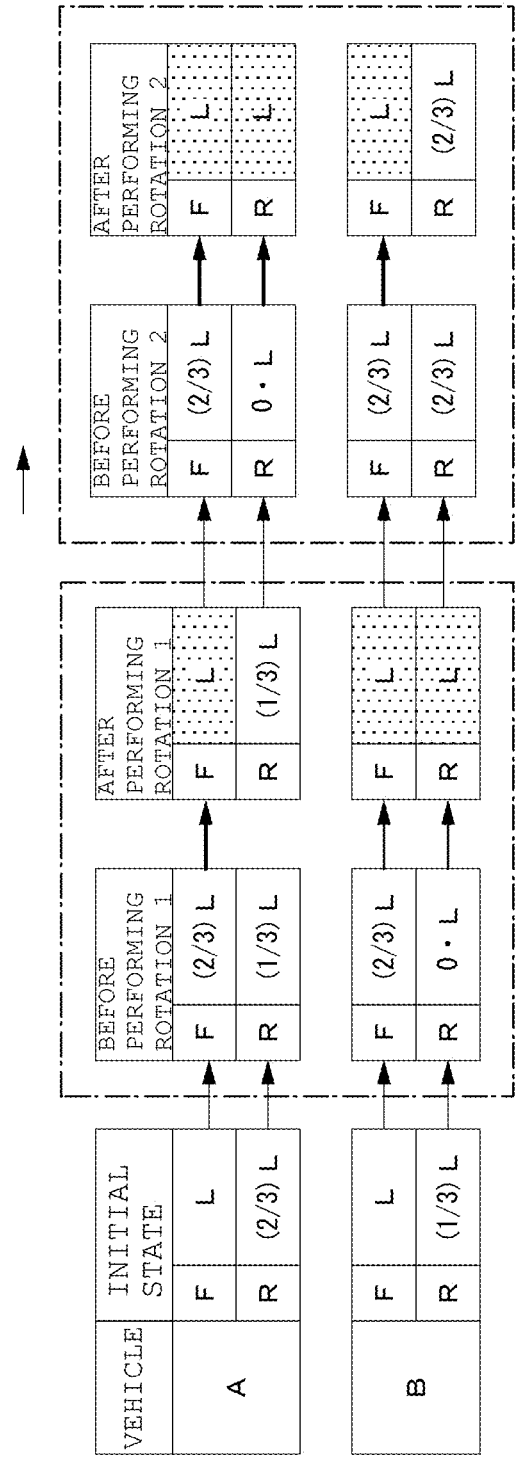
FIG. 6 is a diagram illustrating a conventional method of tire replacement for a mining vehicle.

In FIG. 4, the progress of tire replacement of the tire replacement pair of a vehicle C equipped with the rear tires having the life amount of (⅔) L and a vehicle D equipped with the rear tires having the life amount of (⅓) L, is also illustrated. Incidentally, in the initial state, the front tires of the vehicles A to D are new tires.

Then, after running the vehicle A and the vehicle B until up to the tire replacement time of the front tires F (step S22), checking whether or not the vehicle B is usable as the tire replacement pair (step S23), and also checking whether or not the vehicle A is usable as the tire replacement pair (step S24). Here, an unusable state means a state in which the vehicle B is in an operation stop state due to a trouble caused by the vehicle B, or a state in which a tire wear has not been advanced because of the long operation stop time, or a state in which tires have been damaged as the tires have stepped on crushed stones, and so on.

In a case where both of the vehicle A and the vehicle B are usable as the tire replacement pair, the process proceeds to the step S25 and, after replacing the rear tires R of the vehicle B with the front tires F of the vehicle A and the front tires F of the vehicle B, fitting new tires to the vehicle A and the vehicle B as the front tires F of the vehicle A and the front tires F of the vehicle B (step S26).

As illustrated in FIG. 4, with respect to the vehicle C and the vehicle D, similar to the vehicle A and the vehicle B, in a case where the vehicle C and the vehicle D are usable as the tire replacement pair, after replacing the rear tires R of the vehicle D with the front tires F of the vehicle C and the front tires F of the vehicle D, fitting new tires to the vehicle C and the vehicle D as the front tires of the vehicle C and the front tires of the vehicle D.

After completion of the step S26, returning back to the step S22 to cause the vehicle A and the vehicle B to further run until up to the replacement time of the front tires F.

At the time point when the step S26 is completed again (after the rotation 2 in FIG. 4 is performed), the state of the tires of the vehicle A and the state of the tires of the vehicle B become the same with the initial state. Accordingly, after returning back to the steps S22 again, it is sufficient to perform the steps S22 to S26, while keeping the vehicle A as the vehicle A and the vehicle B as the vehicle B.

This is the same with the case of the vehicle C and the vehicle D.

Next, an explanation is given as to a case where, in the step S23, the vehicle B is unusable as the tire replacement pair. Incidentally, for convenience of explanation, the tire replacement pair of the vehicle C and the vehicle D are considered to be the tire replacement pair to which unusable case has occurred, as illustrated in FIG. 4.

In a case where the vehicle D corresponding to the vehicle B is unusable as the tire replacement pair, the process proceeds to the step S31 to check whether or not a vehicle B' (D' in FIG. 4) equipped with rear tires having the life amount of 0·L exists among the vehicles that are to be the tire replacement targets. If the vehicle B' (D') exists, assuming the vehicle B' (D') as the vehicle B (D), replacing the rear tires R of the vehicle B with the front tires F of the vehicle A and the front tires F of the vehicle B, then the process proceeds to the step S26 to fit new tires to the vehicle A and the vehicle B as the front tires F of the vehicle A and the front tires F of the vehicle B. If the vehicle B' (D' in FIG. 4) equipped with rear tires having the life amount of 0·L does not exist among the vehicles that are to be the tire replacement targets, the tire replacement process terminates.

Even though a figure is omitted, in the step S24, in a case where the vehicle A is unusable as the tire replacement pair, the process proceeds to the step S41 to check whether or not a vehicle A' equipped with rear tires having the life amount of (⅓) L exists among the vehicles that are the tire replacement targets. If the vehicle A' exists, assuming the vehicle A' as the vehicle A and replacing the rear tires R of the vehicle B with the front tires F of the vehicle A and the front tires F of the vehicle B. Thereafter, the process proceeds to the step S26 to fit new tires to the vehicle A and the vehicle B as the front tires F of the vehicle A and the front tires F of the vehicle B. If the vehicle A equipped with the rear tires having the life amount of (⅓) L does not exist among the vehicles that are the tire replacement targets, the tire replacement process terminates.

Although the present invention has been described with reference to the embodiments and examples, the technical scope of the present invention is not limited to the scope described in the above embodiments. It is apparent to those skilled in the art that various modifications or improvements may be added to the above-described embodiments. It is also apparent from the claims that embodiments with such modifications or improvements may also be included in the technical scope of the present invention.

For example, in the above-described first embodiment and the second embodiment, the vehicle was the mining vehicle, however, the vehicle to which the present invention is applicable is not limited to this vehicle. The present invention may be applicable to any vehicles equipped with two front tires and four rear tires, as long as the vehicles employ the replacement method in which the front tires are replaced when the life amount becomes (⅔) L and the rear tires are replaced when the life amount becomes 0 (0·L).

Further, in the above-described first embodiment and the second embodiment, the life amount L, which serves as the indication for replacement, of the front tires and the rear tires of the vehicle was the average time required for the tires to reach the predetermined wear amount, however, the life amount L may be a running distance of the vehicle. Alternately, by measuring the wear amount of the tires, and the measured wear amount may be used as the life amount L.

Furthermore, in the second embodiment, the tire replacement pair were set to two pairs, however, it is needless to say that the tire replacement method is the same regardless of the number of pairs.

In summary, it can also be described as follows. That is, the present invention provides a method for replacing tires of a vehicle equipped with two front tires and four rear tires, the method including: a step (a) of grasping a life amount L, which serves as an indication for tire replacement, of front tires and rear tires of a plurality of vehicles that are to be tire replacement targets; a step (b) of extracting, from among the plurality of vehicles, a vehicle α equipped with rear tires having a life amount of (⅓) L; a step (c) of extracting, from among the plurality of vehicles, a vehicle ß equipped with rear tires having a life amount of 0; a step (d) of replacing the rear tires of the vehicle ß with the front tires of the vehicle α and the front tires of the vehicle ß; and a step (e) of fitting new tires to the vehicle α and the vehicle ß as the front tires of the vehicle α and the front tires of the vehicle ß.

Thus, it is possible to reduce the amount of stock tires having residual life amounts and shorten the non-used period, thus the tire resources can be utilized efficiently.

Further, the above-described method includes extracting a pair of a vehicle equipped with rear tires having a life amount of (2/3) L and a vehicle equipped with rear tires having a life amount of (1/3) L, and when one of the life amounts of the rear tires of the two vehicles becomes 0, replacing the rear tires of one of the two vehicles having the life amount of 0 with the front tires of the two vehicles and fitting new tires to the two vehicles as the front tires of the two vehicles.

That is, if the pair of the vehicle a equipped with the rear tires having the life amount of (2/3) L and the vehicle b equipped with the rear tires having the life amount of (1/3) L are extracted, the vehicle a becomes the vehicle α and the vehicle b becomes the vehicle ß in the tire replacement of the odd number of times, and the vehicle a becomes the vehicle ß and the vehicle b becomes the vehicle α in the tire replacement of the even number of times. Therefore, the tire replacement can be performed more efficiently.

Furthermore, the present invention provides a tire replacement instruction device that outputs an instruction for tire replacement to a vehicle equipped with two front tires and four rear tires, the device including: a life amount collecting means that collects, from a plurality of vehicles that are to be tire replacement targets, information of a life amount L, which serves as an indication for tire replacement, of front tires and rear tires of the plurality of vehicles that are to be the tire replacement targets; a memory means that stores the collected life amount for each of the vehicles; a tire replacement vehicle extracting means that extracts, from among the plurality of vehicles stored in the memory means, a vehicle α equipped with rear tires having a life amount of (1/3) L and a vehicle ß equipped with rear tires having a life amount of 0; and a tire replacement instruction output means that outputs the instruction for tire replacement to each of the extracted vehicle α and the extracted vehicle ß, in which the tire replacement instruction output means outputs the instruction to replace the rear tires of the vehicle ß with the front tires of the vehicle α and the front tires of the vehicle ß, and to fit new tires to the vehicle α and the vehicle ß as the front tires of the vehicle α and the front tires of the vehicle ß.

By employing the configuration described above, it is possible to realize the tire replacement instruction device capable of efficiently utilizing the tire resources.

REFERENCE SIGN LIST

10: tire replacement instruction device, 11: life amount collecting means, 12: memory means, 13: tire replacement vehicle extracting means, 14: tire replacement instruction output means, 100, 101-10$n$: mining vehicle, F: front tire, R: rear tire.

The invention claimed is:

1. A method for replacing tires of a vehicle equipped with two front tires and four rear tires, the method comprising:
   a step (a) of grasping a life amount L, which serves as an indication for tire replacement, of front tires and rear tires of a plurality of vehicles that are to be tire replacement targets;
   a step (b) of extracting, from among the plurality of vehicles, a vehicle α equipped with rear tires having a life amount of (1/3) L;
   a step (c) of extracting, from among the plurality of vehicles, a vehicle β equipped with rear tires having a life amount of 0;
   a step (d) of replacing the rear tires of the vehicle β with the front tires of the vehicle α and the front tires of the vehicle β; and
   a step (e) of fitting new tires to the vehicle α and the vehicle β as the front tires of the vehicle α and the front tires of the vehicle β.

2. The method for replacing tires of a vehicle according to claim 1, wherein the life amount L is a wear amount or a usage time period or a vehicle running distance.

3. The method for replacing tires of a vehicle according to claim 1, wherein the method includes extracting a pair of a vehicle equipped with rear tires having a life amount of (2/3) L and a vehicle equipped with rear tires having a life amount of (1/3) L, and when one of the life amounts of the rear tires of the two vehicles becomes 0, replacing the rear tires of one of the two vehicles having the life amount of 0 with the front tires of the two vehicles and fitting new tires to the two vehicles as the front tires of the two vehicles.

4. The method for replacing tires of a vehicle according to claim 2, wherein the method includes extracting a pair of a vehicle equipped with rear tires having a life amount of (2/3) L and a vehicle equipped with rear tires having a life amount of 1/3 L, and when one of the life amounts of the rear tires of the two vehicles becomes 0, replacing the rear tires of one of the two vehicles having the life amount of 0 with the front tires of the two vehicles and fitting new tires to the two vehicles as the front tires of the two vehicles.

* * * * *